(12) United States Patent
Yasukawa

(10) Patent No.: US 9,079,417 B1
(45) Date of Patent: Jul. 14, 2015

(54) COLOR MIXING CHECKING METHOD FOR INKJET PRINT HEAD AND PRINTING APPARATUS

(71) Applicant: CANON KABUSHIKI KAISHA, Tokyo (JP)

(72) Inventor: Tetsuro Yasukawa, Ichikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/612,047

(22) Filed: Feb. 2, 2015

(30) Foreign Application Priority Data

Feb. 13, 2014 (JP) ................... 2014-025831

(51) Int. Cl.
*B41J 2/205* (2006.01)
*B41J 2/21* (2006.01)
*B41J 2/045* (2006.01)
*G06K 15/10* (2006.01)
*H04N 1/405* (2006.01)

(52) U.S. Cl.
CPC ............ *B41J 2/2103* (2013.01); *B41J 2/04593* (2013.01); *B41J 2/2056* (2013.01); *G06K 15/102* (2013.01); *G06K 15/107* (2013.01); *H04N 1/4055* (2013.01)

(58) Field of Classification Search
CPC .... B41J 2/2056; B41J 2/04593; G06K 15/02; G06K 15/107; G06K 15/1865; H04N 1/4055; H04N 1/4057
USPC ............... 347/5, 9, 14, 15; 358/1.12, 1.8, 1.9, 358/3.13, 3.14, 3.21
See application file for complete search history.

(56) References Cited

U.S. PATENT DOCUMENTS

| | | | | |
|---|---|---|---|---|
| 6,834,926 B2* | 12/2004 | Shibata | ............................ | 347/15 |
| 7,551,315 B2* | 6/2009 | Hoshii et al. | .................... | 358/1.2 |
| 7,742,195 B2* | 6/2010 | Kakutani | ..................... | 358/3.13 |
| 2015/0062234 A1 | 3/2015 | Wada et al. | | |

FOREIGN PATENT DOCUMENTS

JP        10151753 A      6/1998

\* cited by examiner

*Primary Examiner* — An Do
(74) *Attorney, Agent, or Firm* — Fitzpatrick, Cella, Harper & Scinto

(57) ABSTRACT

In the regions in the check pattern image where the stripe is formed, the density of the region with higher density has a density value lower than the density value in the case without occurrence of the color mixing and the density of the region with lower density has a density value higher than the density value in the case without occurrence of the color mixing. Regarding this difference in the density value, determination on whether or not density unevenness caused by the color mixing or the landing position deviation occurs is made by using a threshold value and a threshold value different from that.

8 Claims, 8 Drawing Sheets

# COLOR MIXING CHECKING METHOD FOR INKJET PRINT HEAD AND PRINTING APPARATUS

BACKGROUND OF THE INVENTION

1. Field of the Invention

The present invention relates to a color mixing checking method for an inkjet print head and a printing apparatus, and more particularly to a technology for printing a check pattern and for determining a color mixing in ink ejected from the print head with another color ink, based on the printed check pattern.

2. Description of the Related Art

As a checking method for determining whether or not color mixing occurs in ink ejected from a print head used in a printing apparatus such as an inkjet printer and the like with another ink, a method described in Japanese Patent Laid-Open No. H10-151753 (1998) is known. Color mixing of ink may occur in a supply path for supplying ink from an ink tank to the print head. Specifically, a defect that leakage of ink from or infiltration of ink into a supply path for the respective type of ink potentially occur may be detected in a manufacturing process of the print head. In this case, color mixing might occur by that another type of ink infiltrates into the supply path of one type of ink to mix with the one type of ink, and therefore such products need to be subjected to a check in advance. Moreover, in a process in which the print head is used, ink of another color infiltrates into an ejection port of ink of one color due to wiping with rubbing on a head surface, and color mixing of ink may occur, for example. In this case, it is desirable that such a state is detected in advance and the color mixing ink is removed.

In the method described in Japanese Patent Laid-Open No. H10-151753 (1998), by performing sample printing by using ink in a basic color and by optically measuring the color of the sample, it is determined that color mixing has occurred in a case that the measured color is different from an original color.

However, a hue of the printed sample pattern may be different also due to landing position deviation of an ink droplet such as overlapping of the ink droplets ejected to a print medium with each other or separating of the ink droplets from each other or the like. The method disclosed in Japanese Patent Laid-Open No. H10-151753 (1998) cannot discriminate a difference in the hue caused by the landing position deviation from the difference in the hue caused by the color mixing ink. Thus, with the Japanese Patent Laid-Open No. H10-151753 (1998), the difference in the hue not caused by the color mixing ink may be erroneously determined to be caused by the color mixing ink.

SUMMARY OF THE INVENTION

The object of the present invention is to provide a color mixing checking method for a print head that can discriminate and determine a difference in a hue caused by color mixing ink from those caused by the other causes and a printing apparatus capable of conducting the check.

In a first aspect of the present invention, there is provided a color mixing checking method of a print head provided with ejection-port groups of different types of ink, each of which is constituted by a plurality of ejection ports, the method comprising: a pattern printing step of using the print head to print a check pattern with the ink by ejecting the ink from the ejection ports of the ejection-port group for one type of the ink among the different types of ink; a density value obtaining step of obtaining a density value of the printed check pattern in correspondence to the plurality of ejection ports of the ejection-port group; and a determining step of determining a color mixing of the print head by comparing the obtained density value with a first threshold value having a density value smaller than a predetermined reference value and a second threshold value having a density value larger than the predetermined reference value, respectively.

In a second aspect of the present invention, there is provided an inkjet printing apparatus that performs printing by using a print head provided with ejection-port groups of different types of ink, each of which is constituted by a plurality of ejection ports, the apparatus comprising: a pattern printing unknit configured to use the print head to print a check pattern with the ink by ejecting the ink from the ejection ports of the ejection-port group for one type of the ink among the different types of ink; a density value obtaining unit configured to obtain a density value of the printed check pattern in correspondence to the plurality of ejection ports of the ejection-port group; and a determining unit configured to determine a color mixing of the print head by comparing the obtained density value with a first threshold value having a density value smaller than a predetermined reference value and a second threshold value having a density value larger than the predetermined reference value, respectively.

According to the above-described configuration, in a color mixing checking of the print head, determination of the color mixing can be performed with the difference in the hue caused by the color mixing ink being discriminated from those caused by the other causes.

Further features of the present invention will become apparent from the following description of exemplary embodiments (with reference to the attached drawings).

DESCRIPTION OF THE EMBODIMENTS

Embodiments of the present invention will be described below in detail by referring to the attached drawings.

Figure 1:
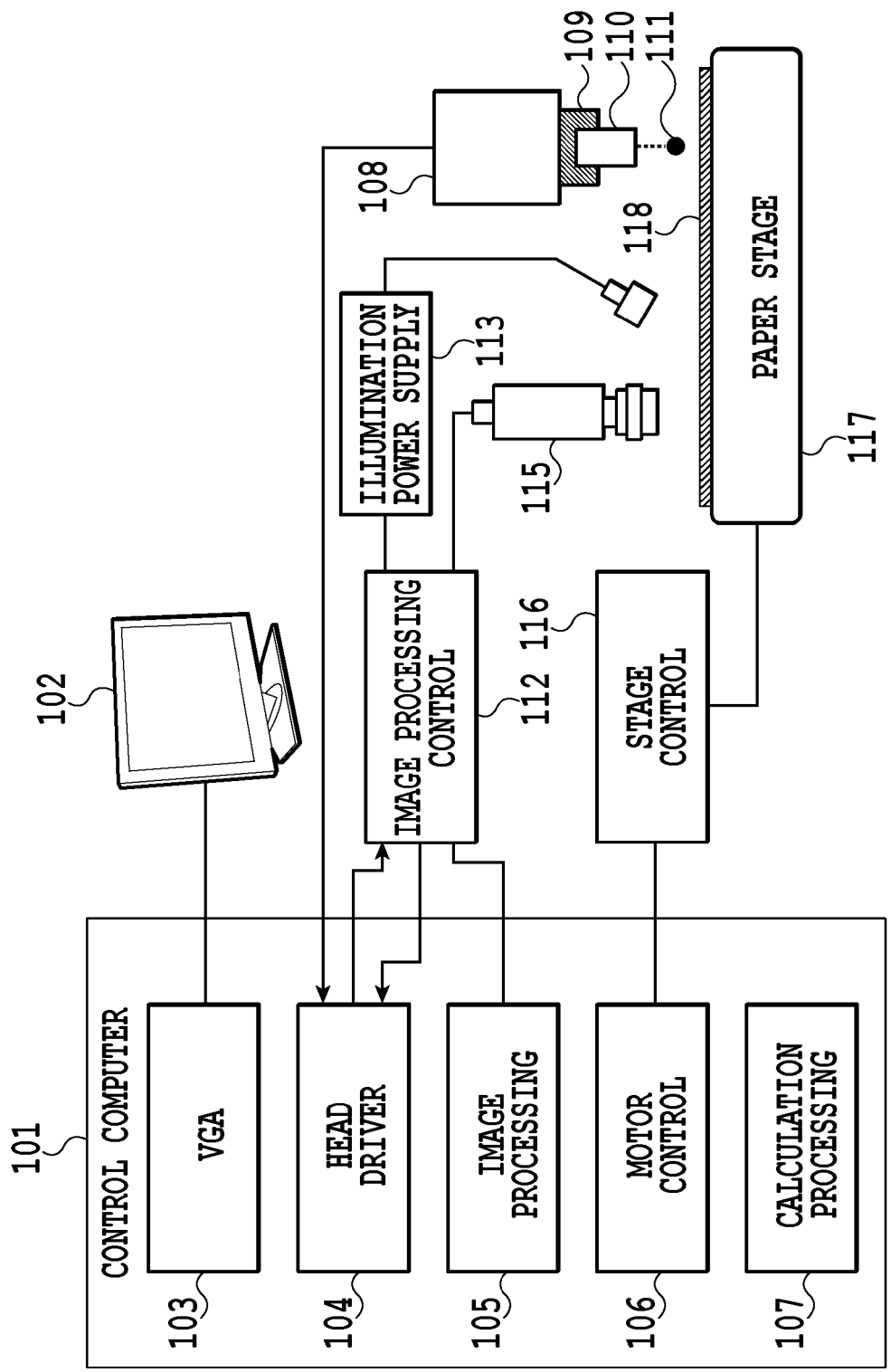
FIG. 1 is a schematic diagram illustrating a configuration of a checking device of an inkjet print head according to an embodiment of the present invention.

FIG. 1 is a schematic diagram illustrating a configuration of a checking device for an inkjet print head according to an embodiment of the present invention, and the checking device is used in a check in manufacture of the print head. In FIG. 1, reference numeral 101 denotes a control computer. The control computer 101 includes a VGA board 103 for display output, and output display is performed on a monitor 102 by control by the VGA board 103. Moreover, the control computer 101 includes a head driver 104, an image processing board 105, and a motor control board 106 so as to generate a printing signal for driving a print head 110 of an inkjet type and to output. Moreover, the control computer 101 includes a calculation processing board 107 to execute calculation processing of image data taken in from the image processing board 105.

The printing signal outputted from the head driver 104 is converted to a signal conforming to the inkjet print head 110 in a connected printing signal conversion substrate 108. Then, the converted signal is sent to the print head 110 through a contact probe unit (not shown) of a carriage 109. As a result, an ink droplet 111 is ejected from the print head 110 and lands on a print medium 118, whereby an image is printed.

The print medium 118 is placed on the paper stage 117, vacuumed into the paper stage 117 by a vacuum device and is brought into close contact with and secured to it. In this embodiment, a print medium having a coated surface capable of uniformly absorbing the ink droplet 111 when the ink droplet lands on the print medium is used for the recoding medium 118. On the paper stage 117, an encoder (not shown) for obtaining position information of the print medium 118 in a stage is provided. Thereby, in a case that a check pattern is to be printed, control can be made so that the pattern is accurately accommodated in an angular field of a CCD camera 115. That is, a motor control board 106 of the control computer 101 controls a position of the paper stage 117 through a stage controller 116.

A printing pattern accommodated in the angular field of the CCD camera 115 can be irradiated with an image processing illumination 114 connected to an illumination power supply 113. Moreover, a detection signal of the CCD obtained by taking an image with the CCD camera 115 is sent to the image processing board 105 through an image processing control substrate 112. For the illumination 114 in this embodiment, an LED illumination which can output the respective wavelength of RGB and also ensure durability and light-amount stability is used. The illumination power supply 113 has an external control terminal, and the respective light amounts of RGB can be controlled by control from the image processing control substrate 112. For the CCD camera 115, a line sensor type CCD camera is used in this embodiment. An advantage obtained by use of the line sensor type CCD is that it has high resolution for a relatively low cost and can take in only a necessary portion of a printed image. As a result, even an image with high resolution can become image data with a small capacity, and a processing speed can be improved. An area sensor type CCD camera may be used for the CCD camera 115 as long as processing capacity of the image processing board 105 is sufficient and capable of high-speed processing.

The above-described checking system may have a configuration of a system constituted by a plurality of constituent element or may be a single-body apparatus configuration.

Figure 2:
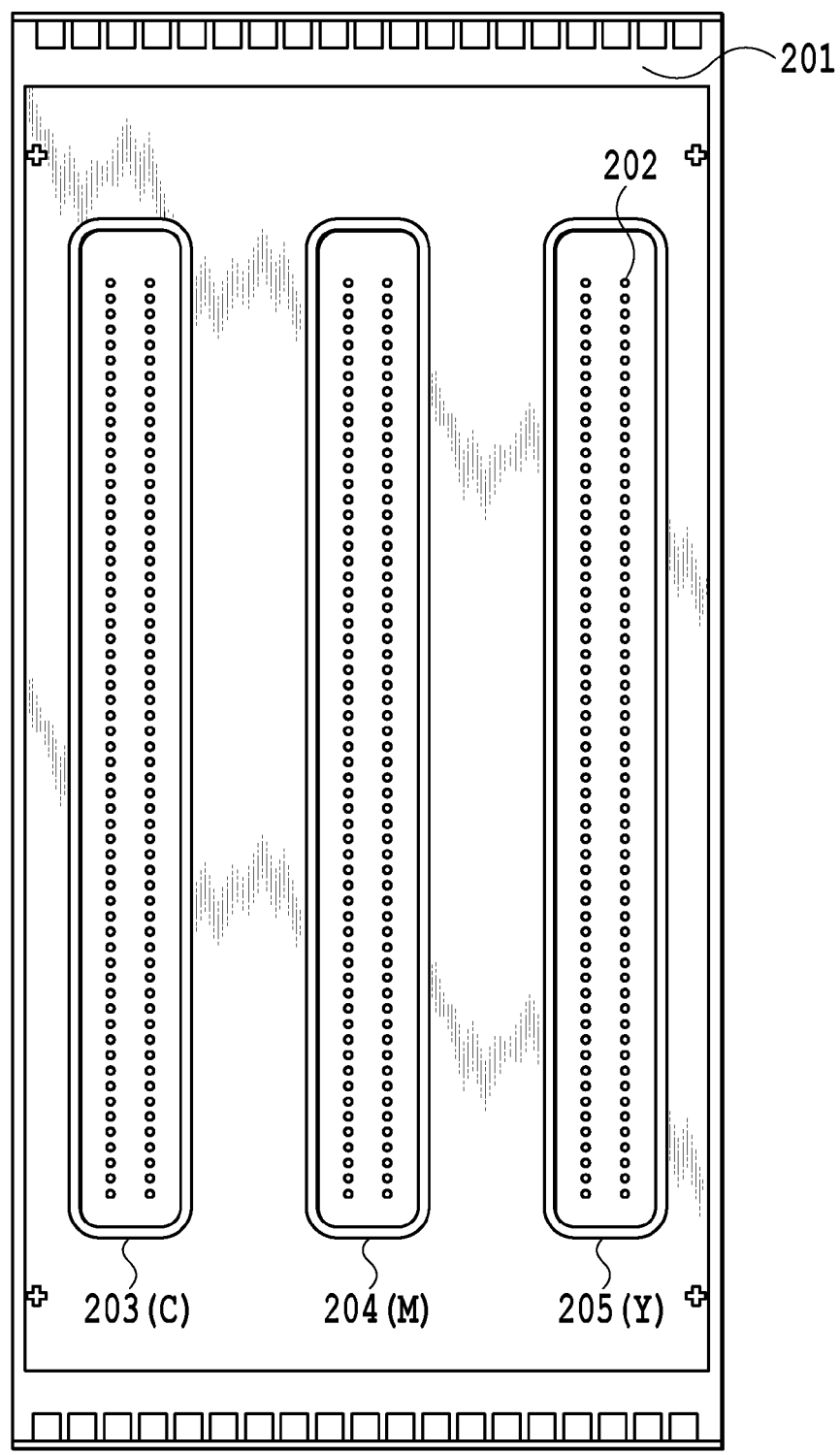
FIG. 2 is a view showing a printing element substrate of the print head to be checked illustrated in FIG. 1.

FIG. 2 is a view showing a printing element substrate of the print head to be checked, illustrated in FIG. 1. As shown in FIG. 2, an ejection port 202 for ejecting ink is provided on a printing element substrate 201. Moreover, an electro-thermal conversion element (not shown) corresponding to the ejection port 202 is provided therein, and ink is ejected from the ejection port by generating an air bubble in the ink in the ejection port by heat generated by the electro-thermal conversion element. The ejection ports 202 constitute two arrays of ejection port arrays (ejection port groups) for each of ink of cyan (C), magenta (M), and yellow (Y). That is, an ejection port array 203 of cyan ink, an ejection port array 204 of magenta ink, and an ejection port array 205 of yellow ink are disposed on the printing element substrate 201.

Regarding color mixing of the ink which will be described below, in a case that there is high possibility of the color mixing occurring in the adjacent ejection ports, the color with possibility of color mixing can be identified in advance. Moreover, it is needless to say that application of the present invention relating to this color mixing is not limited to the print head of the above-described ejection type by generating air bubbles. The present invention can be applied to any print head regardless of the ejection type as long as it is a print head ejecting ink of a plurality of types such as a print head of a type of ejecting ink by using a piezo element, for example.

Some embodiments will be described below on a color mixing check for the print head provided with the above-described printing element substrate 201.

First Embodiment

Figure 3:
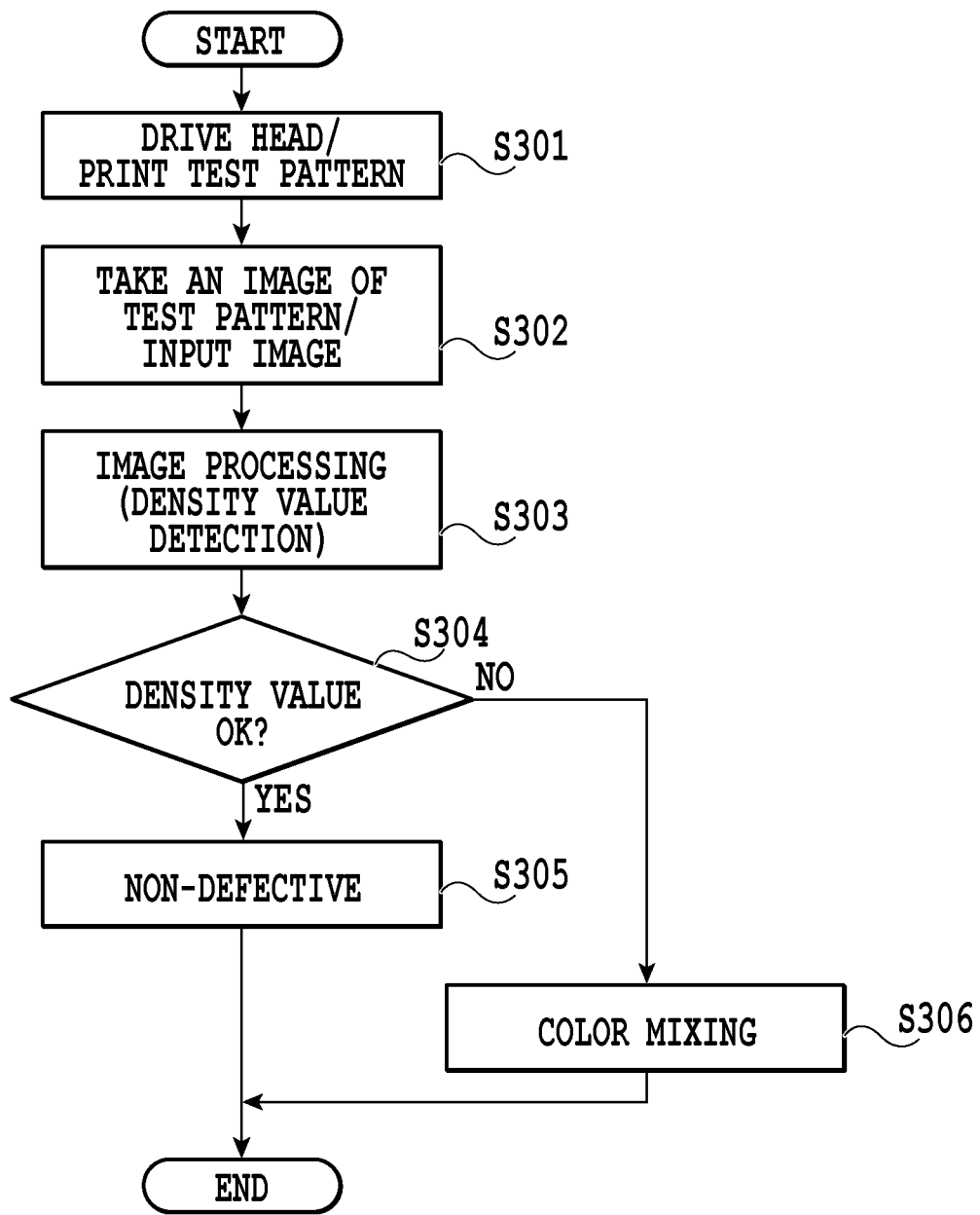
FIG. 3 is a flowchart illustrating processing of a color mixing checking method according to a first embodiment of the present invention.
Figure 4:
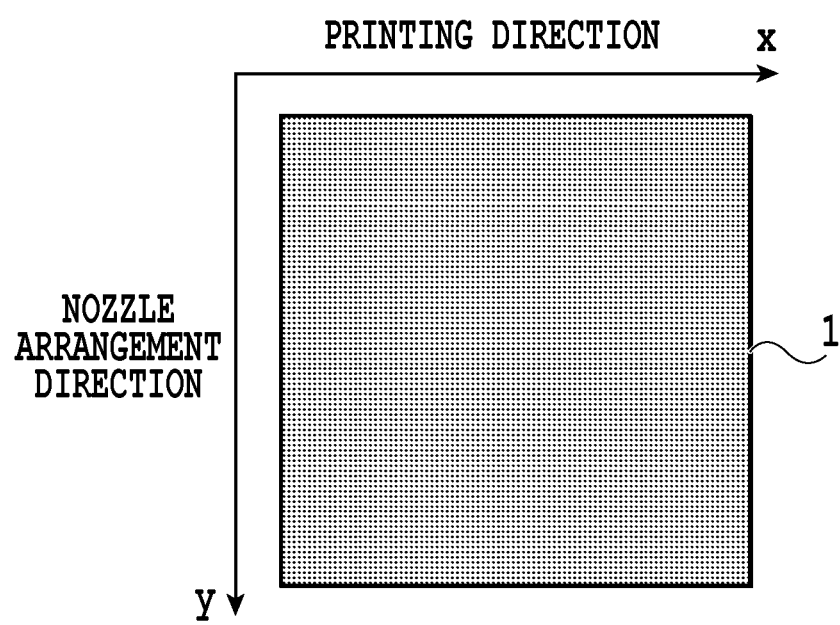
FIG. 4 is a diagram schematically illustrating a color mixing check pattern according to the first embodiment.
Figure 5:
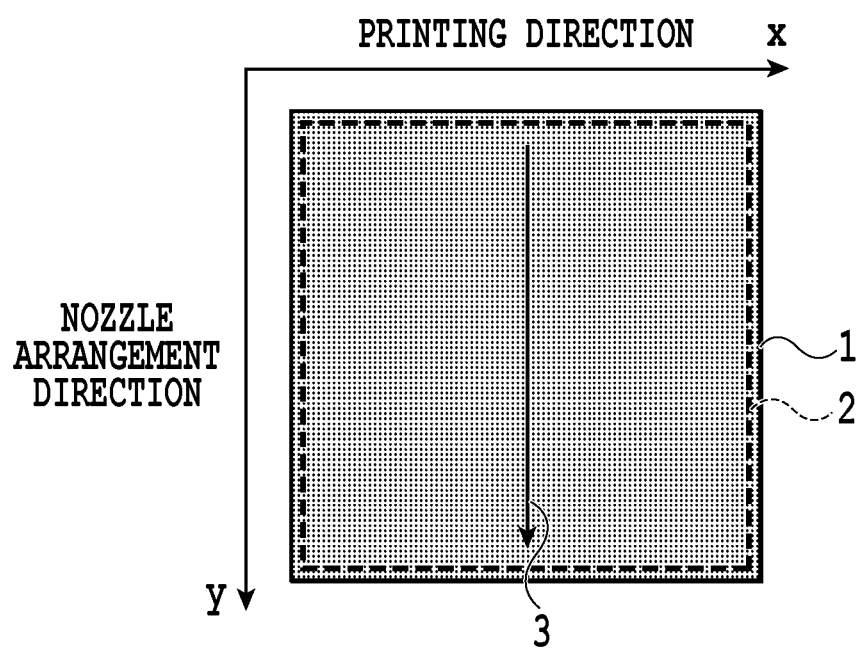
FIG. 5 is a diagram schematically illustrating the color mixing checking method according to the first embodiment.

FIG. 3 is a flowchart illustrating processing of a color mixing checking method according to a first embodiment of the present invention and illustrates processing and operations executed by the checking device illustrated in FIG. 1. FIG. 4 is a diagram schematically illustrating a color mixing check pattern according to this embodiment. FIG. 5 is a diagram schematically illustrating the color mixing checking method according to this embodiment.

As illustrated in FIG. 3, in the color mixing check according to this embodiment, the color mixing check pattern is printed and its image is taken, a density value is determined by image processing, and presence of color mixing is determined on the basis of a density difference based on this density value.

In FIG. 3, first, at Step S301, the ink droplet 111 is ejected by driving the print head 110, and pattern printing for a color mixing check is made on the print medium 118. As illustrated in FIG. 4, a color mixing check pattern 1 is printed as a solid single-color pattern for each of the color inks. Specifically, the respective check patterns are printed by using each of the ejection port arrays 203, 204, and 205 of cyan, magenta, and yellow inks illustrated in FIG. 2. That is, in a case that the pattern is to be printed by using the ejection port array of one of color inks, the inks are not ejected from the ejection ports of the other two color ink ejection port arrays, and the ink is ejected from the ejection port of the ejection port array of that color ink and the check pattern 1 is printed. In a printing operation of the check pattern 1, first, the print head 110 is mounted and fixed to the checking device as illustrated in FIG. 1, and the print medium 118 is fixed to the paper stage 117. Then, the paper stage 117 is moved in a direction opposite to a "printing direction" illustrated in FIG. 4 with respect to the fixed print head, the ink is ejected from the ejection port of the applicable ejection port array of the print head 110, and a rectangular check pattern as illustrated in FIG. 4 is printed.

Next, at Step S302, an image of the check pattern 1 of the respective ink colors printed at Step S301 is taken by the CCD camera 115, and image data as an image taken result is input into image processing board 105. In image taking, light is irradiated to the color mixing check pattern 1 by the image processing illumination 114, and setting of a light source and a light amount of the illumination is preferably made such that an image with high contrast can be obtained so that a color mixing portion can be detected easily in image processing after the image taking. In this embodiment, the light having a complementary relationship with a tone of an expected color mixing is irradiated. Thereby, density of the color mixing portion becomes higher than the case without color mixing, and a density difference caused by presence of color mixing can be determined more clearly.

Next, at Step S303, the image processing is applied to the image data of the check pattern obtained by the above-described image taking, and density value detection (density value obtaining) is made. The density detection is performed as follows. First, as illustrated in FIG. 5, a check area 2 is set on the image of the color mixing check pattern 1. The check area 2 is set at a predetermined position where the color mixing check pattern 1 in the taken image is taken in. Next, as illustrated in FIG. 5, scanning 3 is performed in an ejection-port arrangement direction, and the density value is detected by one pixel. More specifically, image data obtained by image taking is read out for each pixel in the direction of the scanning 3, and a brightness value of each pixel obtained on the basis of the read-out signal is obtained as a density value. A scanning position is preferably at a center position of the check area. In this embodiment, the pixel which is a unit for which the density value is obtained is in a relationship of one to one with the ejection port of the ejection port array in the print head 110, whereby the color mixing can be determined by one ejection port. However, the relationship between the pixel of the unit for obtaining the density value and the ejection port is not limited to this example in application of the present invention. The relationship may be such that a plurality of, that is, two or three ejection ports correspond to the pixel of the unit for which the density value is obtained, for example. Even in a case that the color mixing is detected in an ejection port range made of a plurality of the ejection ports, it can be handled by modification of the print head in manufacture and can be handled by executing processing of removing the color mixing in the detected ejection port range in use, for example.

Figure 6A:
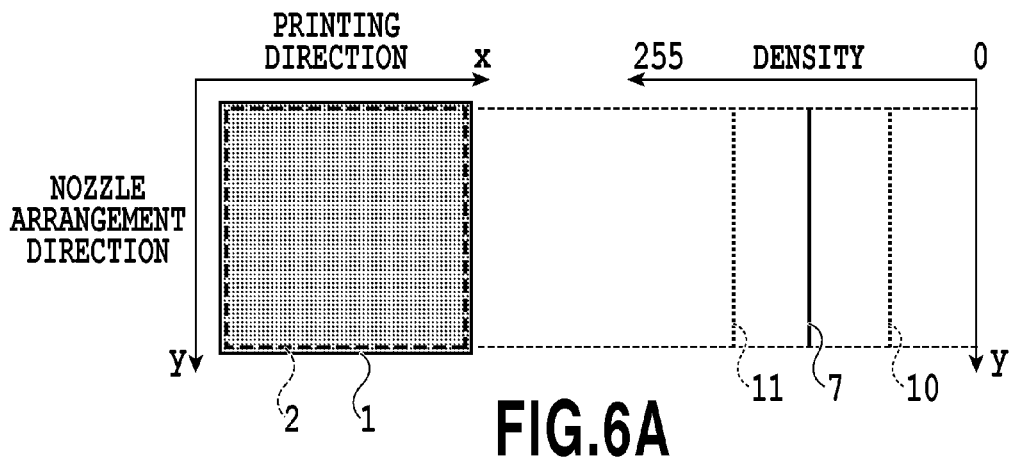
FIGS. 6A to 6C are diagrams for explaining the color mixing checking method according to this first embodiment.
Figure 6B:
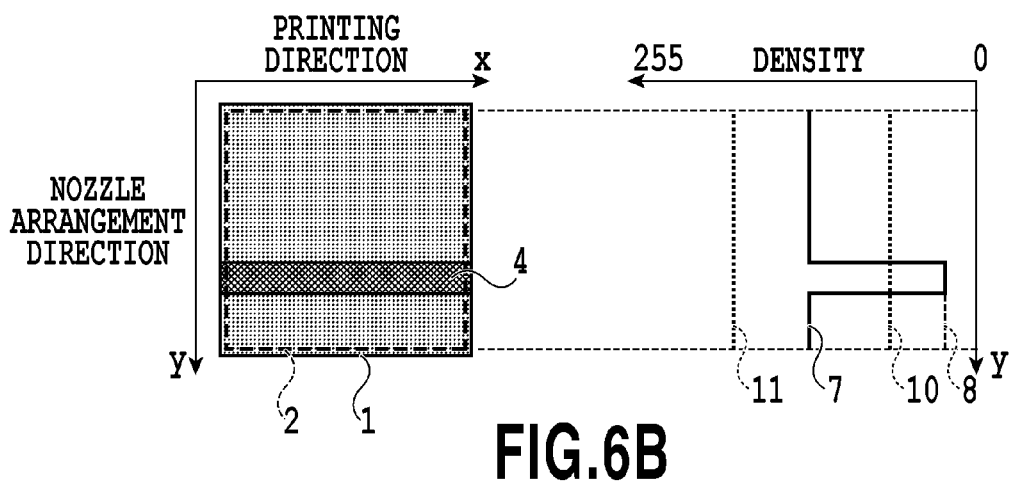
Figure 6C:
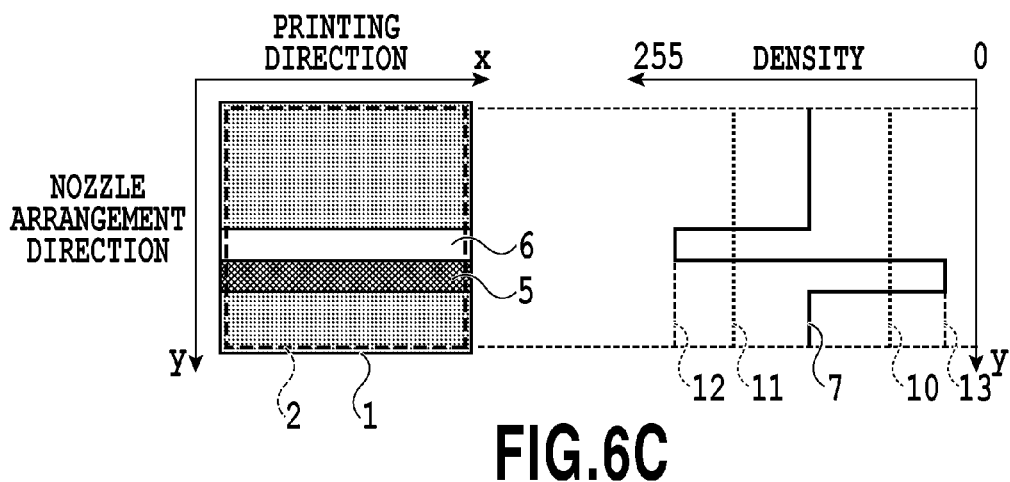

Next, at Step S304, determination is made on whether or not the color mixing has occurred on the basis of the detected density value. FIGS. 6A to 6C are diagrams for explaining the color mixing checking method according to this embodiment, and FIGS. 6A, 6B and 6C illustrate check patterns printed in a case that the color mixing has not occurred, in a case that the color mixing has occurred, and in a case that an landing position is deviated, respectively. In a case that printing is performed by using the print head in which the color mixing has occurred or in which the landing position is deviated, the pattern printed by the ink ejected from the applicable ejection port includes a region with different density along the printing direction crossing the ejection-port arrangement direction, that is, a linear stripe, for example.

In a case that the color mixing has not occurred as illustrated in FIG. 6A, a density value 7 which is constant over the entire ejection port in the ejection-port arrangement direction is detected by the checking method described in FIG. 5. In a case that the color mixing has occurred as illustrated in FIG. 6B, the density of a region 4 on the image of the check pattern 1 becomes a density value 8 which is lower than the density value (reference value) 7 in a case that the color mixing has not occurred. Regarding the density value (brightness value) 8 in the case that the color mixing has occurred, density of the region 4 corresponding to the color mixing ejection port becomes higher due to the effect of the light in a complementary color by illumination, and the density value becomes lower (smaller) than the density value 7 as described above.

On the other hand, in a case that stripes which indicates density unevenness caused by the landing position deviation is generated as illustrated in FIG. 6C, there are a region 5 with higher density and an adjacent region 6 with lower density. In this case, in the region 5 and the region 6 forming the stripes in the image of the check pattern 1, the density of the region 5 has a density value 13 lower than the density value 7 at which the color mixing has not occurred, and the density of the region 6 has a density value 12 higher than the density value 7 at which the color mixing has not occurred. In a case that such landing position deviation occurs, the region 5 in which the density becomes higher due to overlap of ink dots and the region 6 in which the ink dot density becomes lower are generated, and a difference is generated in the density.

At Step S304, determination is made on whether or not the color mixing has occurred using a predetermined threshold value 10 between the density value 7 and the density value 8 and also between the density value 7 and the density value 13. Moreover, determination is made on whether or not density unevenness has occurred due to the landing position deviation by using a predetermined threshold value 11 between the density value 7 and the density value 12. That is, at Step S304, in a case that there is a density value smaller than the threshold value 10 but not larger than the threshold value 11 in the density values detected for the check pattern 1, it is determined that the color mixing has occurred in the corresponding ejection port range. Moreover, in a case that there is a density value smaller than the threshold value 10 and a density value larger than the threshold value 11 in the density values detected for the check pattern 1, it is determined that the density unevenness has occurred due to the landing position deviation in the ejection port range corresponding to them. On the other hand, in a case that there is no density value smaller than the threshold value 10 and also there is no density value larger than the threshold value 11 in the density values detected for the check pattern 1, it is determined that the print head is non-defective with no color mixing.

In the case that it is determined to be non-defective at Step S304, processing for that purpose or data indicating that the checked print head has passed the check, for example, is stored to a memory at Step S305. On the other hand, in the case that it is determined that the checked print head has the color mixing or density unevenness, the processing for that purpose or the fact that the checked print head has the color mixing or density unevenness is notified as distinguished from each other at Step S306.

As described above, according to this embodiment, two types of threshold values are used for the density value detected for the check pattern and therefore a color mixing check can be performed as distinguished between the color mixing and the density unevenness due to the landing position deviation. As a result, a highly accurate color mixing check can be conducted.

Moreover, according to the color mixing checking method of this embodiment, since the check can be conducted by using the density value (brightness value), the check can be conducted by a monochrome camera without using a color camera, and a highly accurate check can be made inexpensively.

Second Embodiment

Figure 7:
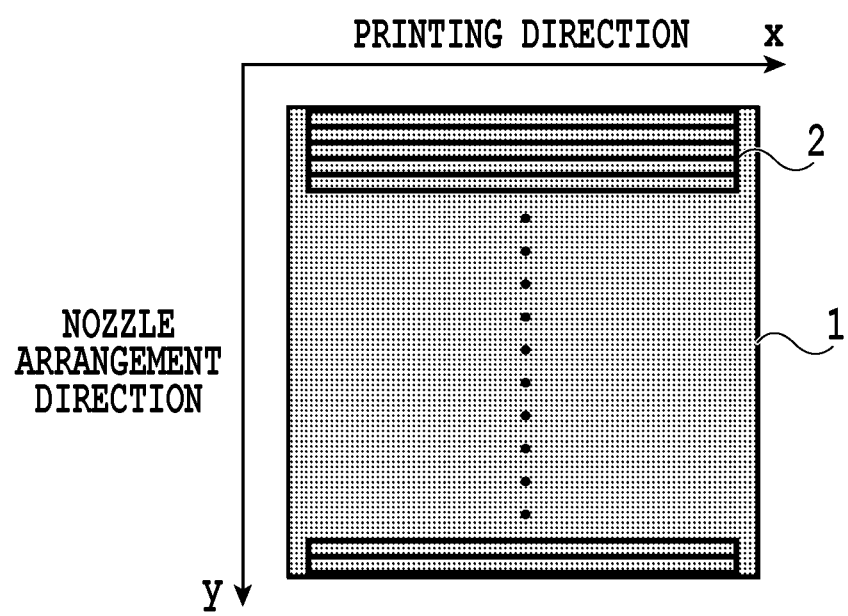
FIG. 7 is a diagram for explaining a color mixing checking method according to a second embodiment of the present invention.

FIG. 7 is a diagram for explaining a color mixing checking method according to a second embodiment of the present invention. The color mixing checking method of this embodiment is different from the first embodiment in a detection area for density value detection at Step S303 illustrated in FIG. 3 and the other configurations are substantially the same.

As illustrated in FIG. 7, in this embodiment, the check areas 2 each having a width equal to a length of the check pattern 1 in the printing direction are provided in the number of the ejection ports in the ejection-port arrangement direction in the density value detection, and an average density value of each of the check areas 2 is obtained. More specifically, in the taken image of the check pattern obtained at Step S302 in FIG. 3, density values for each of the pixels in the respective check areas are obtained and their average value is obtained, and that is set to be a density value of the check area 2 (S303 in FIG. 3). Then, after that (S304 to S306), similarly to the above-described first embodiment, it is determined whether the print head is non-defective or has the color mixing or density unevenness on the basis of the obtained density value of each area, and processing according to the determination is executed.

In a measuring method of the first embodiment, a position for scanning in the taken image is one point with respect to the printing direction and thus, it is susceptible to noises such as dusts, mists and the like. On the other hand, since the check area is set wide with respect to the printing direction in this embodiment, it is not easily susceptible to the noises. That is, possibility of misdetection that those without color mixing are determined to be the color mixing is reduced, and highly accurate check can be conducted.

Third Embodiment

Figure 8:
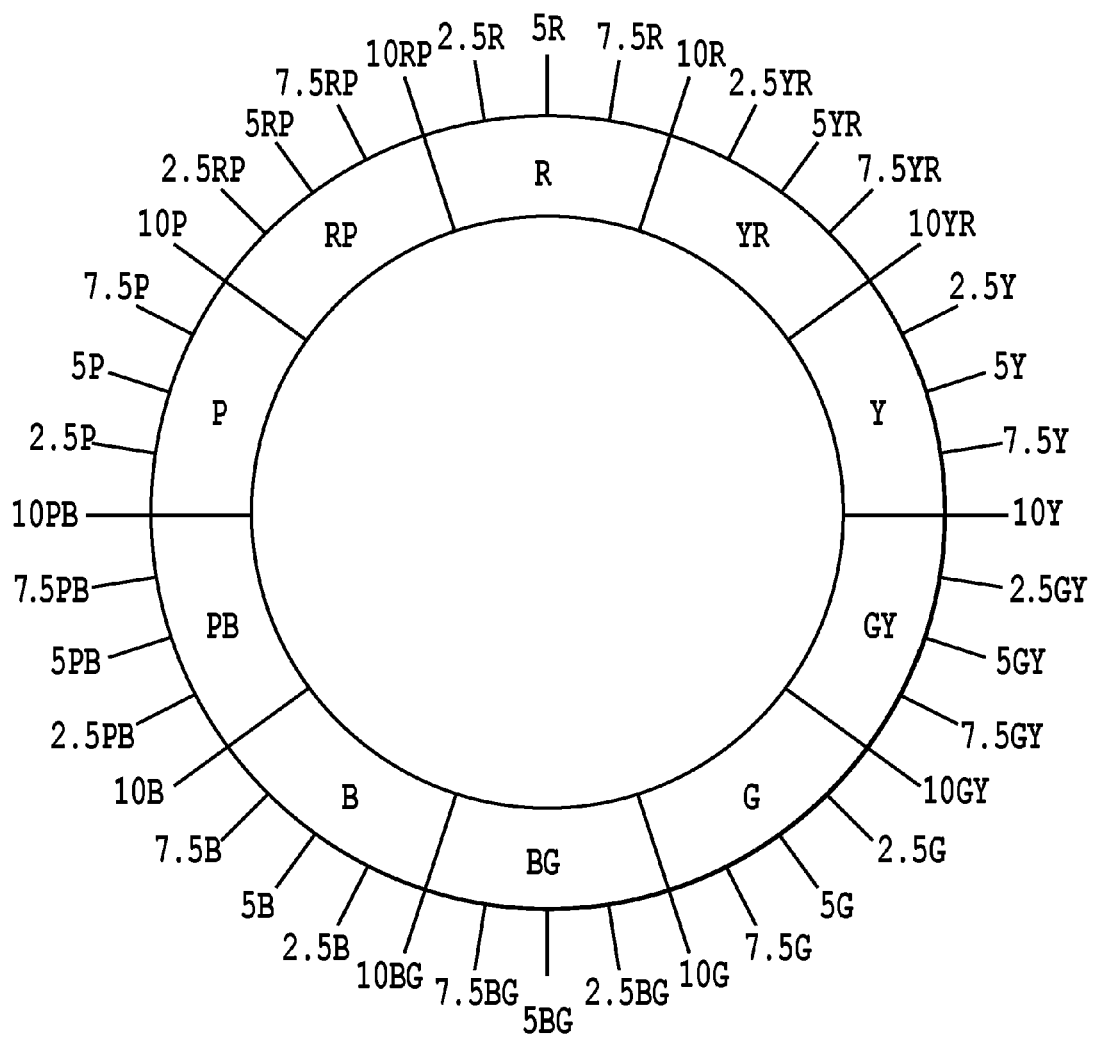
FIG. 8 is a diagram for explaining a hue circle used in a color mixing checking method according to a third embodiment of the present invention.

FIG. 8 is a diagram illustrating a hue circle standardized by JIS Z 8721 (Colour specification-Specification according to their three attributes) used for the color mixing checking method according to a third embodiment of the present invention. This embodiment relates to an image taking method in which the color mixing check of the above-described first embodiment or second embodiment can be conducted with higher detection capability. By using the image taking method of this embodiment, the density difference between a color mixing portion and a portion without the color mixing can be made clearer. This embodiment is different from the first embodiment or the second embodiment in the image taking method at Step S302 illustrated in FIG. 3, while the other configurations are substantially the same and thus, only the differences will be explained.

In the hue circle illustrated in FIG. 8, a hue can be indicated by a combination of a symbol (R, Y, G, B and P) and a number (2.5 and 10 or the like) in a hue circle. In this hue circle, "R" indicates red, "Y" indicates yellow, "G" indicates green, "B" indicates blue, and "P" indicates purple. Regarding hues in the middle of them, "YR" indicates yellow red, "GY" indicates green yellow, "BG" indicates blue green, "PB" indicates purple blue, and "RP" indicates red purple. In general, the hue in a relationship of opposite location is assumed to be a complementary color in this hue circle.

At Step S302 in FIG. 3, illumination/image taking for the color mixing check pattern 1 is performed. Specifically, the light in a color is irradiated having a relationship located exactly opposite in the hue circle illustrated in FIG. 8, that is, a complementary color with respect to the color of the ink which is likely to be mixed in (the color of) the ink for which the check pattern is printed. In a case that the color mixing check pattern 1 in the cyan ink is to be irradiated with the light an image is taken, for example, the ink of the ejection-port array of the magenta ink adjacent to the ejection-port array of the cyan ink is the most highly likely to be mixed in color as illustrated in FIG. 2. In the hue circle illustrated in FIG. 8, magenta is RP and the hue with the relationship located exactly opposite to that is G and thus, the light in the G color which is a complementary color of RP is irradiated an image is taken. A range of the hue of the illumination in the G color is preferably any one of 2.5G, 5G, 7.5G, and 10G.

In a case that the color mixing check pattern 1 in magenta is irradiated an image is taken, the adjacent ejection-port arrays with high possibility of the color mixing are the ejection-port arrays of the cyan ink and the yellow ink as illustrated in FIG. 2. In this case, since the assumed color mixing can be cyan and yellow, irradiation and image taking are performed in two steps in this embodiment.

In a first step, cyan is BG in the hue circle illustrated in FIG. 8, and the hue with the relationship located exactly opposite to that is R and thus, illumination in the R color which is a complementary color of BG is irradiated an image is taken. A range of the hue of the illumination in the R color is preferably any one of 2.5R, 5R, 7.5R, and 10R. In a second step, yellow is Y in the hue circle illustrated in FIG. 8, and the hue with the relationship located exactly opposite to that is PB and thus, illumination in the PB color which is a complementary color of Y is irradiated an image is taken. A range of the hue of the illumination in the PB color is preferably any one of 2.5PB, 5PB, 7.5PB, and 10PB. The first step and the second step may be switched to be performed. Then, the processing at Step S303 and after in FIG. 3 is applied to the images taken in the two steps, respectively, as described above, and determination of the color mixing is made.

Moreover, in a case that the yellow color mixing check pattern 1 is irradiated for taking its image in this embodiment, the assumed color mixing is magenta as illustrated in FIG. 2. In the hue circle illustrated in FIG. 8, magenta is RP and the hue with the relationship located exactly opposite to that is G and thus, illumination in the G color which is a complementary color of RP is irradiated an image is taken. A range of the hue of the illumination in the G color is preferably any one of 2.5G, 5G, 7.5G, and 10G.

As described above, the color of ink assumed to be highly likely to be mixed is limited in view of a structure of the print head. Therefore, by irradiating the illumination with the light in a color which is a complementary color of the color mixing assumed for the color printing the color mixing check pattern 1, an image can be taken by highlighting the color mixing. As a result, a density difference between a color mixing portion and a portion without the color mixing can be made clearer, and the color mixing check with high detection capability can be conducted.

Fourth Embodiment

A fourth embodiment of the present invention relates to a color of the illumination light in image taking similarly to the above-described third embodiment. More specifically, in addition to clearer density difference between the color mixing portion and the portion without the color mixing described in the third embodiment, the fourth embodiment relates to a configuration for further lowing erroneous determination of the color mixing caused by a change in a hue in a case that density unevenness occurs due to landing position deviation in the color mixing check pattern.

Similarly to the third embodiment, at Step S302 in FIG. 3, illumination/image taking is performed for the color mixing check pattern 1. At this time, an image taken by irradiating the light in the color obtained by adjusting the color which becomes a complementary color of the ink color for printing the color mixing check pattern 1 is read into the image processing board 105.

Specifically, in the case that the cyan color mixing check pattern 1 is irradiated for taking its image, the assumed color mixing is magenta. In the hue circle illustrated in FIG. 8, cyan is BG, and magenta is RP. Since the hue with the relationship located exactly opposite to RP is G, illumination in a color of the light adjusted to become closer to BG with respect to the G color which is a complementary color of RP is irradiated an image is taken. Specifically, a range of the hue of the adjusted illumination is preferably any one of 10G, 2.5BG, and 5BG. Moreover, in a case that the magenta color mixing check pattern 1 is irradiated an image is taken, the assumed color mixing can be cyan and yellow as described in the third embodiment, and irradiation and image taking are performed in two steps. In a first step, magenta is RP and cyan is BG in the hue circle illustrated in FIG. 8, and the illumination in a color of the light adjusted to become closer to RP with respect to the R color which is a complementary color of BG is irradiated and an image is taken. A range of the hue of the adjusted illumination is preferably any one of 10RP, 2.5R, and 5R. In a second step, magenta is RP and yellow is Y in the hue circle illustrated in FIG. 8, and the illumination in a color of the light adjusted to become closer to RP with respect to the PB color which is a complementary color of Y is irradiated. A range of the hue of the adjusted illumination is preferably any one of 10PB, 2.5P, and 5P. The first step and the second step may be switched and performed.

Moreover, in the case that the yellow color mixing check pattern 1 is irradiated and an image is taken, the color mixing with high possibility is magenta. In the hue circle illustrated in FIG. 8, yellow is Y and magenta is RP. The illumination adjusted in a color of the light adjusted to become closer to Y with respect to the G color which is a complementary color of RP is irradiated, and an image is taken. A range of the hue of the adjusted illumination is preferably any one of 5GY, 7.5GY, and 10GY.

As described above, by irradiating illumination in a color adjusted to become closer to the hue of the color mixing check pattern 1 with respect to the color which is a complementary color of the hue of the assumed color mixing, a difference in contrast of the color mixing check pattern and a margin portion becomes smaller in the taken image. As a result, an influence on the taken image of the change in the hue in a case that density unevenness occurs in the color mixing pattern becomes less. Therefore, not only that the difference in the density between the color mixing portion and the portion without the color mixing becomes clearer, erroneous determination of the color mixing caused by a change in the hue in a case that the landing deviation of ink droplets occurs in the color mixing check pattern 1 can be further reduced.

Other Embodiments

In the above-described embodiments, typical checking devices of the present invention are described, but the color mixing checking method described in the above embodiments is not limited to the above-described checking devices and can be used in a printing apparatus such as an inkjet printer. In such a printing apparatus, a wiping operation in which a surface of the print head on which the ejection ports are provided is rubbed by a wiper is performed so as to remove ink droplets and water droplets adhering to the surface, for example. In this case, ink of a type different from the ink might be mixed into the ejection port by the rubbing by the wiper, and the problem of color mixing also occurs in this case. In response to that, the color mixing check described in each of the above-described embodiments can be conducted before starting the printing operation, for example. Specifically, the ink in the color according to the check is ejected from the print head to the print medium being conveyed similarly to the printing operation, and the check pattern is printed. Then, an optical sensor mounted on a carriage or the like is made to scan the pattern so as to obtain a density value, and the color mixing can be determined similarly to each of the above-described embodiments on the basis of this obtained density value.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-025831, filed Feb. 13, 2014 which is hereby incorporated by reference wherein in its entirety.

What is claimed is:

1. A color mixing checking method of a print head provided with ejection-port groups of different types of ink, each of which is constituted by a plurality of ejection ports, said method comprising:
a pattern printing step of using the print head to print a check pattern with the ink by ejecting the ink from the ejection ports of the ejection-port group for one type of the ink among the different types of ink;
a density value obtaining step of obtaining a density value of the printed check pattern in correspondence to the plurality of ejection ports of the ejection-port group; and
a determining step of determining a color mixing of the print head by comparing the obtained density value with a first threshold value having a density value smaller than a predetermined reference value and a second threshold value having a density value larger than the predetermined reference value, respectively.

2. The color mixing checking method according to claim 1, wherein said density value obtaining step takes an image of the check pattern by using an image taking device, and obtains the density value from the taken image of the check pattern.

3. The color mixing checking method according to claim 2, wherein said density value obtaining step obtains the density value for each pixel by scanning the taken image for each pixel along an ejection-port arrangement direction of the ejection-port group.

4. The color mixing checking method according to claim 2, wherein said density value obtaining step provides check areas, each having a width corresponding to a length of the check pattern in a direction crossing an ejection-port arrangement direction of the ejection-port group in the taken image, in the number of the ejection ports along the ejection-port arrangement direction of the ejection-port group, and obtains an average density value of the respective check areas as the density value.

5. The color mixing checking method according to claim 2, wherein said density value obtaining step irradiates light in a complementary color to a hue of the color mixing and takes an image of the check pattern.

6. The color mixing checking method according to claim 1, wherein said determining step sets the density value in a case that there is no color mixing to be a reference value.

7. The color mixing checking method according to claim 1, wherein said determining step, in a case that there is a density value exceeding the first threshold value and the second threshold value, respectively, in the obtained density values, determines that landing position deviation occurs in the print head, and in a case that there is only a density value exceeding one of the first threshold value and the second threshold value, determines that the color mixing occurs in the print head.

8. An inkjet printing apparatus that performs printing by using a print head provided with ejection-port groups of different types of ink, each of which is constituted by a plurality of ejection ports, said apparatus comprising:

a pattern printing unit configured to use the print head to print a check pattern with the ink by ejecting the ink from the ejection ports of the ejection-port group for one type of the ink among the different types of ink;

a density value obtaining unit configured to obtain a density value of the printed check pattern in correspondence to the plurality of ejection ports of the ejection-port group; and a determining unit configured to determine a color mixing of the print head by comparing the obtained density value with a first threshold value having a density value smaller than a predetermined reference value and a second threshold value having a density value larger than the predetermined reference value, respectively.

* * * * *